United States Patent [19]

Fujita

[11] Patent Number: 4,477,386

[45] Date of Patent: Oct. 16, 1984

[54] METHOD FOR PRODUCING OIL FROM RICE EMBRYO-BUDS

[76] Inventor: Kenjiro Fujita, 279 Fukuicho, Ono-shi, Hyogo, Japan

[21] Appl. No.: 336,267

[22] Filed: Dec. 31, 1981

[30] Foreign Application Priority Data

Jan. 31, 1981 [JP] Japan ............................ 56-13256

[51] Int. Cl.[3] ........................ C09F 5/02; C11B 1/00

[52] U.S. Cl. ........................................ 260/412.2

[58] Field of Search ............................ 260/412.2

[56] References Cited

U.S. PATENT DOCUMENTS 2,585,978 2/1952 Van Atta et al. ............ 260/412.2 X
3,255,220 6/1966 Baer et al. ..................... 260/412.2

FOREIGN PATENT DOCUMENTS 533254 11/1956 Canada ........................ 260/412.2
4262 8/1911 United Kingdom ............ 260/412.2

OTHER PUBLICATIONS

Swern Bailey's Industrial Oil and Fat Products, Intersc. Pub. N.Y. 3rd ed. pp. 637-647, 663-679 (1964).
Deckbar et al., The Cotton Gin and Oil Mill Press Reprint from Jul. 19, 1952 Issue.
Planck, "Rice Quality and Rice Oil Research at the Southern Regional Research Lab", Reprint from the Jun. 15, 1955, Annual Issue of The Rice Journal.

*Primary Examiner*—Helen M. S. Sneed
*Attorney, Agent, or Firm*—Koda and Androlia

[57] ABSTRACT

A method for producing oil from rice embryo-buds, wherein the rice embryo-buds containing the oil and obtained from the brown rice through polishing are selected to be uniform in grain size, then said uniform grain size rice embryo-buds alone are fed into a compressor to press-crushed by physical treatment at low temperature without raising the temperature of the oil, in order to keep the γ-oryzanol, a component of said oil, undamaged in terms of its effect.

4 Claims, No Drawings

METHOD FOR PRODUCING OIL FROM RICE EMBRYO-BUDS

BACKGROUND OF THE INVENTION

1. Field of the Invention

The present invention relates to a method for producing oil from rice embryo-buds, and particularly to a method for producing rice embryo-bud oil by using a physical treatment process without raising the temperature of the oil.

2. Prior Art

Extraction of oil from rice embryo-buds contained in unpolished rice has been known publicly. Rice embryo-buds contain γ-oryzanol in nature. γ-oryzanol is a new nutrient substance found to be contained in vegetable oil, in 1953 in Japan. It is different from conventional hormones, drugs, etc. in the chemical composition, and it functions mainly to invigorate the action of the endocrine system through taking part in it. Also, it dilates peripheral blood vessels, thereby bringing about a marked improvement in blood circulation. Consequently, it is also confirmed for this substance that it participates in growth acceleration in animals, and has the anti-bacterial as well as bacteriocidal action.

However, said conventional method for extraction had a drawback in that γ-oryzanol ($C_{40}H_{50}O_4$) is destroyed and its effect is lessened because of the use of chemicals such as normal hexane for treatment.

SUMMARY OF THE INVENTION

It is a primary object of the present invention to provide a manufacturing method for oil extracted from rice embryo-buds obtained from unpolished rice, without using chemicals for treatment, but by using a physical process, thereby preventing the damage to the effect of γ-oryzanol contained in the rice germ oil.

In keeping with the principles of this invention, the objects are accomplished by a unique method comprising the steps of separating grain-form rice embryo-buds and crushing said embryo-buds in a compressor under low-temperature atmosphere.

DETAILED DESCRIPTION OF THE INVENTION

Polished rice is obtained by polishing the brown rice by using a rice-cleaning machine, and during hulling, grain-form rice embryo-buds and floured rice brans are extruded in mixed state same as that has been seen in conventional husking process.

Then, by the use of a separator, said grain-form rice embryo-buds are separated from the rice brans, and a large quantity of rice embryo-buds are further sorted out carefully by using a sorter. Through this operation, impurities are eliminated, and only the perfect rice embryo-buds with uniform grain size can be extracted.

Thereafter, a large number of uniform grain size rice embryo-buds are fed into the compressor, and compressed physically under high pressure in the compressing section equipped with cooling system, in the machine. By the process mentioned above, the rice embryo-buds are crushed by pressure, and the oil contained in said rice embryo-buds is squeezed out at low temperature without causing the rise in temperature of the oil.

In this manner, the rice embryo-bud oil alone can be extracted from the unpolished rice. Also, the strained draff left after pressing out the oil from rice germs can be reused as starting material of brown rice enzyme. The compressor referred here means a machine with a structure wherein a large quantity of rice embryo-buds are fed from a hopper, then, they are led to the compressing section equipped with cooling system to be press-crushed there. According to the result of the experiment, 40 l of rice germ oil could be obtained from 1 ton of rice embryo-buds. In the pressing process, the rice embryo-buds must be press-crushed by arranging that the rice germ oil extracted is below 50° C. (approx.) in temperature. The reason for the above is that if said process is carried out at unduly high temperature, γ-oryzanol in rice embryo-buds is decomposed by the heat discharged during press-crushing of rice embryo-buds, resulting in the loss of its effect.

In the method of the present invention, the rice germ oil is extracted from the brown rice by the physical treatment carried out at low temperature, therefor, γ-oryzanol contained in the oil extracted from rice embryo-buds is not destroyed, with its effect maintained intact.

Hence, when this oil is used as a primary component of health foods, etc., it shows the effect on the following cases:

Underdevelopment (of animals), menopausal fatigue, insomnia, disturbance of blood circulation in extremities, decline of energy. Also, in skin diseases, chloasma (liver spots), fine wrinkles, dry or rough skin, chronic eczema, facial melasma, acne vulgaris. It is effective in preventing the aging of skin too.

Furthermore, it is a widely known fact that γ-oryzanol is related to acceleration of hematogenous function, because of the following findings: in animal experiment, increase of body weight, acceleration or resistance to diseases, etc. where observed, with noticeable change in intestinal bacterio-plexus accompanied.

As to the medicinal effect on the skin, in the outer layer of the skin, it counteracts bacteria on the skin surface, with its anti-bacterial action, while helping the skin in controlling the pH (hydrogen ion exponent) to be at 5.5–6.2, without distrubing the bonding between alkali and acid keratin in horny substances, thus enabling the constant pH control which is a natural function of the skin.

In addition, it shows the following effect. The prickle cell layer is particularly closely related to nutrition in the cuticle, and said prickle cells are slightly alkaline at about 7.3–7.5 in pH in normal state, with body fluid flowing in said layer. The γ-oryzanol not only withstands said pH, staying totally undamaged, but rather produces a certain type of energy by causing the dissociation of triterpene alcohol molecules bonded with ferulic acid through esterification in weak alkali. And said energy acts to invigorate the flow of the above-mentioned body fluid and increases the prickle cells. Then, in turn, the new formation of the cells brings about the rejuvenation of the skin.

It is understood that the remarkable effects shown both in internal administration and external application of γ-oryzanol are due to the specific energy produced by the component of this substance. As to what "force" is working, it is assumed that there is something in common with the action to accelerate the metabolism. In other words, the acceleration of respiratory metabolism of cells is resulted from sufficient supply of oxygen, and it is assumed that γ-oryzanol stimulates the formation of oxygen in the body.

From the foregoing description, it should be apparent that the food containing the oil from rice embryo-buds as a primary component shows various and greatly beneficial effects.

I claim:

1. A method for producing oil from rice embryo-buds comprising the ordered steps of:

separating the rice embryo-buds from rice bran; and pressing the rice embryo-buds in a press at high pressure while cooling the press whereby said oil is exracted from the rice embryo-buds at a low temperature.

2. A method for producing oil from rice embryo-buds as set forth in claim 1, wherein a large quantity of rice embryo-buds are sorted out and the rice embryo-buds with specified grain size alone are fed into the compressor.

3. A method for producing oil from rice embryo-buds comprising the steps of cleaning rice, separating grain-form rice embryo-buds from powder-form rice bran, feeding said rice embryo-buds with substantially uniform grain size into a compressor, and extracting oil from said rice embryo-buds by press-crushing said rice embryo-buds under a low temperature atmosphere.

4. A method for producing oil from rice embryo-buds according to claim 3, wherein said extracting step is conducted below 50° C.

* * * * *